United States Patent [19]
Miller, II et al.

[11] Patent Number: 6,061,326
[45] Date of Patent: May 9, 2000

[54] WIDEBAND COMMUNICATION SYSTEM FOR THE HOME

[75] Inventors: Robert Raymond Miller, II, Township of Morris, Morris County; Jesse Eugene Russell, Piscataway, both of N.J.

[73] Assignee: AT&T Corp, New York, N.Y.

[21] Appl. No.: 08/943,312

[22] Filed: Oct. 14, 1997

[51] Int. Cl.[7] .................................................. H04L 12/28
[52] U.S. Cl. .......................... 370/203; 370/470; 370/420
[58] Field of Search .................................... 370/479, 441, 370/486, 493, 494, 495, 200, 260, 420, 203, 465; 375/222

[56] References Cited

U.S. PATENT DOCUMENTS

| | | | |
|---|---|---|---|
| 4,980,897 | 12/1990 | Decker et al. | 375/38 |
| 5,461,610 | 10/1995 | Weerackody | 370/18 |
| 5,519,731 | 5/1996 | Cioffi | 375/260 |
| 5,557,612 | 9/1996 | Bingham | 370/71 |
| 5,596,604 | 1/1997 | Cioffi et al. | 345/260 |
| 5,652,866 | 7/1997 | Barry et al. | 395/500.44 |
| 5,719,923 | 2/1998 | Bemer et al. | 370/493 |
| 5,793,759 | 8/1998 | Rakib et al. | 370/342 |
| 5,825,768 | 10/1998 | Kimbrow et al. | 370/341 |

OTHER PUBLICATIONS

D. Bengtsson and D. Landstrom, "Coding In A Discrete Multitone Modulation System," Master's Thesis, Lulea University of Technology, 1996:051E, 28 pages.

J. A. C. Bingham, "Multicarrier Modulation For Data Transmission: An Idea Whose Time Has Come," *IEEE Communications Magazine,* May 1990, pp. 5–14.

K. S. Jacobsen and J. M. Cioffi, "High–Performance Multimedia Transmission On The Cable Television Network," *IEEE,* 1994, pp. 1048–1052.

*Primary Examiner*—Chau Nguyen
*Assistant Examiner*—Frederic Wolkow

[57] ABSTRACT

A wideband communication system is achieved with apparatus coupled to a wire pair, such as the wire pair provided by a communication services provider at a customer's premises. Disclosed is an embodiment which illustratively employs CDMA as the modulation schema for communicated signals and which, by this means, achieves a bandwidth in the range of 1 MHz. Specifically, a modem is interposed between the wire pair and the customer premises devices which modulates applied signals using code division modulation. The customer premises devices interface with the modem through interfaces that are specialized for the type of device that does the communication, and through a controller that manages the interactions. Illustratively, the apparatus includes the ability to provide one or more POTS ports, an ISDN port, and an asynchronous digital port. Protocol with the provider's network is effected through a signaling channel that occupies a preselected frequency band. Of course, a corresponding modem and controller are present at the service provider's end of the wire pair.

15 Claims, 5 Drawing Sheets

WIDEBAND COMMUNICATION SYSTEM FOR THE HOME

RELATED APPLICATIONS

This invention relates to a co-pending application, Ser. No. 08/858,170, filed May 14, 1997, and assigned to the assignee of this application.

BACKGROUND OF THE INVENTION

This invention relates to wideband wired transmission such as transmission of wideband information over a twisted pair.

In the above-identified co-pending application, an arrangement is disclosed whereby relatively wideband, bi-directional, transmission can be achieved not only in a single wire pair but also in a cable of wires that carry interfering signals. The disclosed arrangement is successful because the signals are modulated to be orthogonal (or nearly orthogonal) to all interfering signals of significant magnitude. Consequently, information can be recovered in spite of the expected interference. By way of example, the above-mentioned patent application employs CDMA as the modulation schema.

Given the realization that wire pairs can be used to communicate relatively wideband information even in an interference-laden environment through use of the disclosed orthogonal modulation techniques, it remains to devise an end-to-end communication system that can take advantage of the newly realized capacity.

SUMMARY

A wideband communication system is achieved with apparatus coupled to a wire pair, such as the wire pair provided by a communication services provider at a customer's premises. Disclosed is an embodiment which illustratively employs CDMA as the modulation schema for communicated signals and which, by this means, achieves a bandwidth in the range of 1 MHz. Specifically, a modem is interposed between the wire pair and the customer premises devices which modulates applied signals using code division modulation. The customer premises devices interface with the modem through interfaces that are specialized for the type of device that does the communication, and through a controller that manages the interactions. Illustratively, the apparatus includes the ability to provide one or more POTS ports, an ISDN port, and an asynchronous digital port. Protocol with the provider's network is effected through a signaling channel that occupies a preselected frequency band. Of course, a corresponding modem and controller is present at the service provider's end of the wire pair.

DETAILED DESCRIPTION

Figure 1:
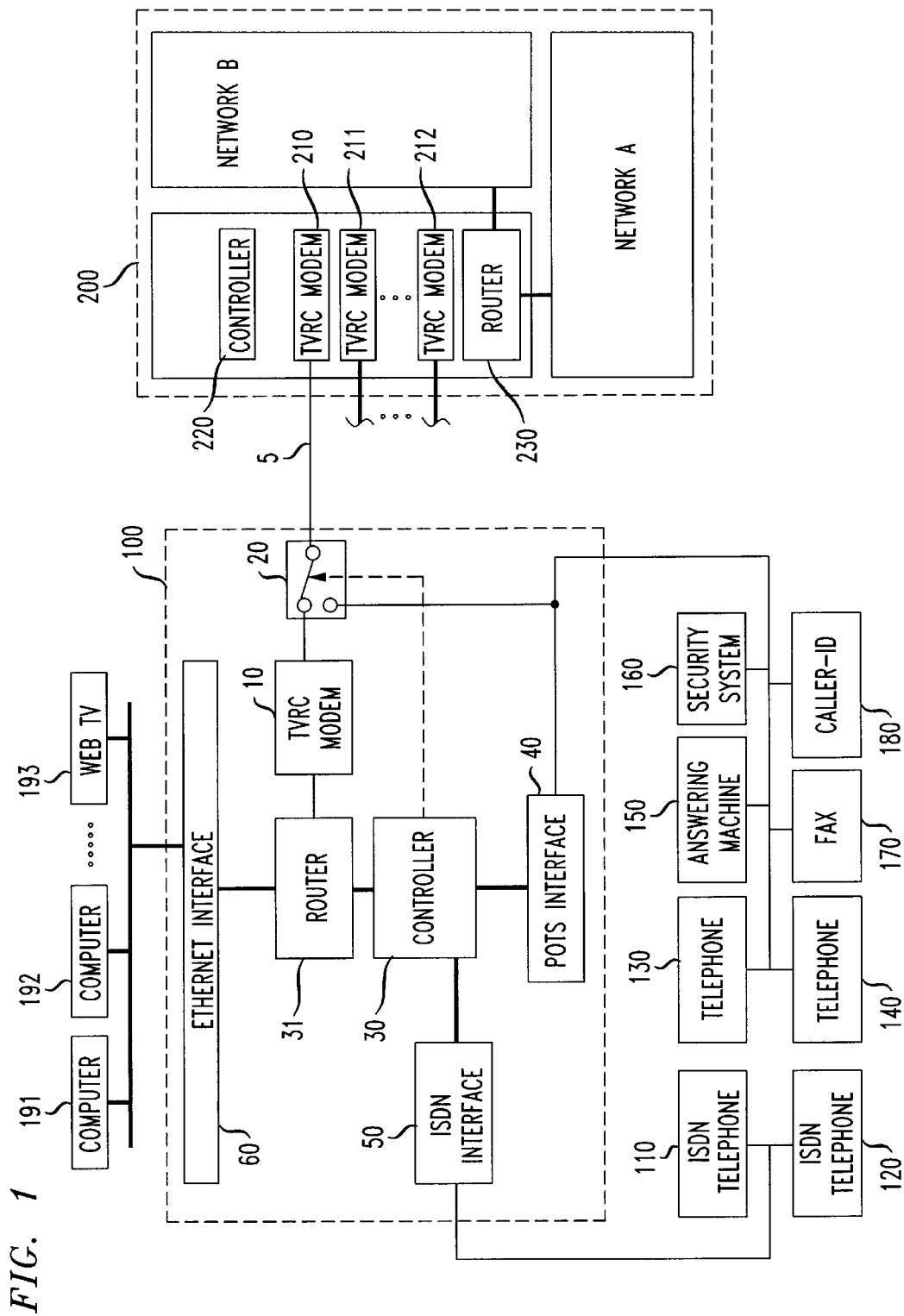
FIG. 1 is a block diagram of a system incorporating the principles disclosed herein.

FIG. 1 presents a block diagram of apparatus 100 that terminates a wire pair 5 at a customer premises, and apparatus 200 that terminates the wire pair at a service provider facility. Apparatus 100 comprises a tethered virtual radio channel (TVRC) modem 10 that is coupled to wire pair 5 through relay switch 20, a POTS interface 40, an IDSN interface 50, an ethernet interface 60, a router 31, and controller 30. The combination of router 31 and controller 30 is interposed between TVRC modem 10 and the group of interfaces (interfaces 40, 50 and 60).

Figure 2:
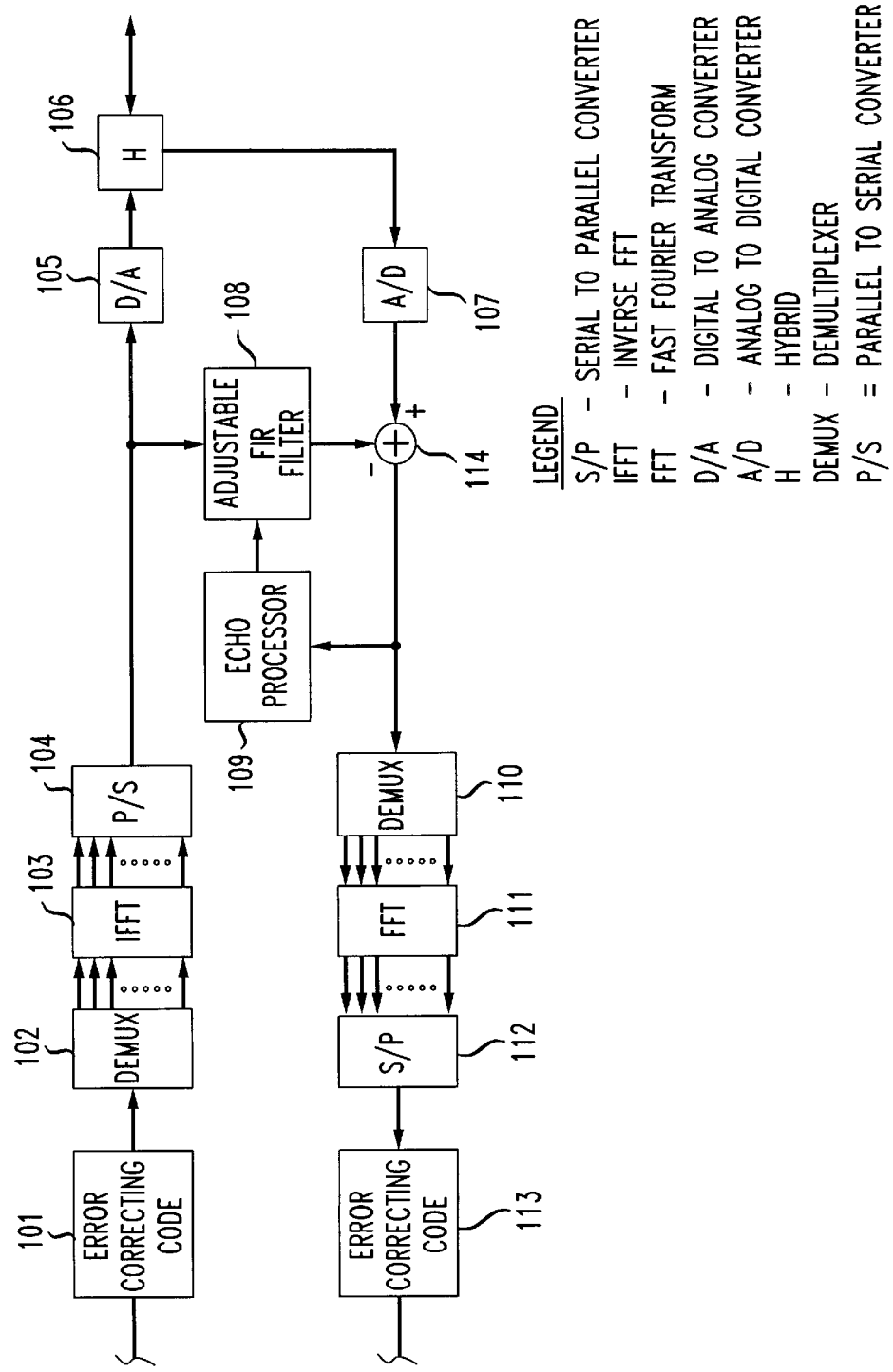
FIG. 2 depicts a modem constructed in accordance with the co-pending related application.

TVRC modem 10 may be constructed in accordance with the teachings of the above-mentioned related application. FIG. 2 illustrates one such construction. Therein, block 101 develops error correcting codes that are added to the data stream that is applied to demultiplexer 102. Demultiplexer 102 distributes groups of bits to inputs of Inverse Fast Fourier Transform processor 103 (where each input represents one of the multi-tones of the IFFT), the corresponding time samples at the output of IFFT 103 are combined in parallel-to-serial converter 104, and the resulting stream of samples is applied to D/A converter 105. The output of converter 105 is applied to hybrid circuit 106, which outputs an analog signal that in FIG. 1 is applied to wire pair 5. Signals incoming on wire pair 5 are applied to hybrid circuit 106 which delivers that signal to A/D converter 107. The output of converter 107 is applied to the negative input of subtractor 114, and the output of subtractor 114 is applied to demultiplexer 110. Demultiplexer 110 applies the time samples to Fast Fourier Transform processor 111 which computes corresponding frequency elements (multi-tones). The developed multi-tones are combined in parallel-to-serial converter 112 and the resulting bit stream is applied to error correction circuit 113. The error-corrected output of circuit 113 forms the TVRC digital data stream that is applied to controller 30.

The output of subtractor 114 is also fed-back to the positive input of subtractor 114 through echo processor 109 and finite impulse response filter 108. Filter 108 is responsive to the output of converter 104, providing a filtered version of that output to subtractor 114 in accordance with the filter coefficients provided by processor 109.

Returning to FIG. 1, controller 30 serves two logically distinct functions: first, it is the means for manipulating and/or conditioning of signals that are applied by, or delivered to, the router; and secondly, it manages the overall process of apparatus 100. In its capacity of the process manager, for example, it supplies clock and other control signals to interfaces 40, 50 and 60 and to TVRC modem 10. It also supplies power to relay 20 (discussed more fully below). As the process manager, controller 30 also directs router 31 to either send data to ethernet interface 60 or to send data to controller 30. Data that is sent to controller 30 is either used for control, or is conditioned and applied to either ISDN interface 50 or to POTS interface 40. ISDN interface 50 applies its output data to a port of apparatus 100 that is adapted to communicate with ISDN phones, such as phones 110 and 120. POTS interface 40 outputs analog signals in the conventional "plain old telephone service" format onto a port of apparatus 100 that is adapted to communicate with POTS devices, such as telephones 130 and 140, answering machine 150, fax machine 170, security alarm system 160, and caller-ID box 180. Ethernet interface 60 applies the data it receives from router 31 to an ethernet bus, to which various digital devices may be connected, such as computers 191 and 192, premises alarm and control devices, web-TV 193, etc.

Conversely, data received by interfaces 40, and 50 from the premises devices is applied to controller 30 where it is conditioned and sent to router 31. Under control of controller 30 (in its manager capacity), router 31 also accepts data from interface 60, which receives data from elements 191, 192 and 193.

Relay 20 has a very simple function: it connects wire pair 5 to TVRC modem 10 as long as apparatus 100 functions. When it does not, such as when there is a power failure, relay 20 disables the power to relay 20 and thereby connects wire pair 5 directly to the POTS output port of apparatus 100.

Figure 3:
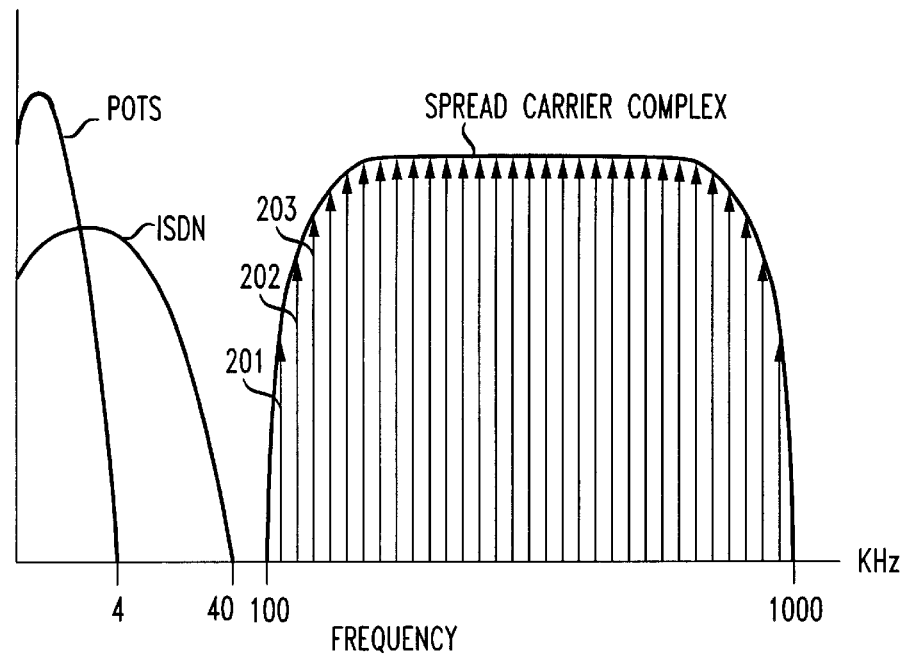
FIG. 3 depicts the available spectrum of a wire pair shown in FIG. 1.

FIG. 3 depicts the available spectrum of wire pair 5, in accordance with a standardized template. It is basically a baseband arrangement, save for a notch between 40 and 100 KHz. Below 40 KHz the template reserves the bandwidth for ISDN transmissions; below 4 KHz the template reserves the bandwidth for POTS transmissions; and between 100 KHz and 1 MHz the template reserves the bandwidth for other transmissions. The template of FIG. 3 was not derived in consequence of any limitation of the transmission approach disclosed herein or in the above-mentioned co-pending application. To promote comity, the following description assumes that hardware embodiments comporting with the principles disclosed herein nevertheless utilize only the band from 100 KHz to 1 MHz, keeping in mind, however, that the disclosed system is basically a "baseband" system in the classical sense; i.e., capable of operating down to DC. To accommodate the classic "baseband" notion and the fact that a system operating in accordance with the principles disclosed herein might operate in the 100 KHz–1 MHz band of FIG. 3, in the context of this disclosure the adjective "baseband" relates to the notion that no up-shifting of a frequency band is undertaken.

In accordance with one feature of the principles disclosed herein, the multi-tones within the employed band are divided into two groups. The first group, e.g., tones 201, 202 and 203, forms a direct signaling channel. The tones of the signaling channel are applied to controller 30 for control purposes. The second group forms the information channel. If desired, each of the groups can independently be divided into subgroups of varying numbers of tones. For example, one information subgroup might comprise a number of tones that is sufficient to provide one 4 KHz band for telephone 130 which may be active, another subgroup might comprise a number of tones that provide 128 KHz band for telephone 110 which may be active, and the remaining subgroup of tones might provide the remaining bandwidth for computer 191, or simply not be actively employed. The tones of a subgroup can be adjacent tones, but do not have to be.

Figure 4:
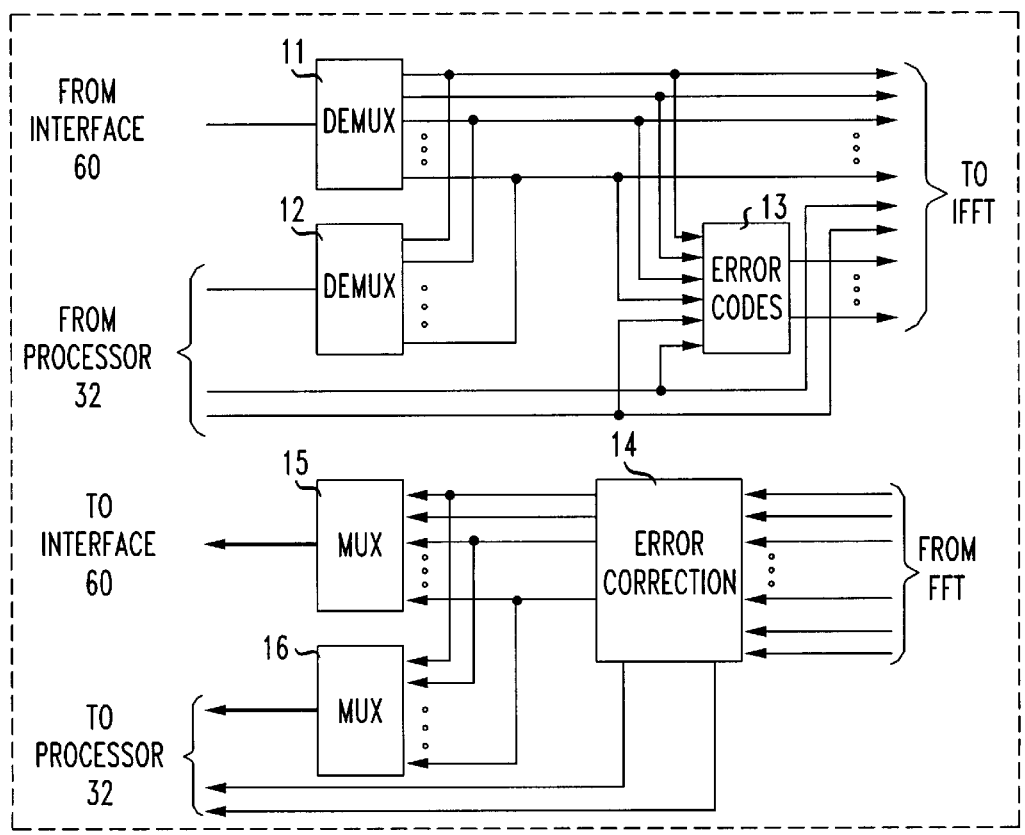
FIG. 4 is an alternative arrangement of the modem depicted in FIG. 2.

When the available bandwidth is thus employed, and when the error correction codes (e.g., Reed Solomon) simply comprise a number of symbols that occupy a given number of the tones applied to IFFT 103, some simplification is attained by combining router 31 with blocks 101, 102, 113, and 112 of FIG. 2 to form an arrangement as shown in FIG. 4. According to FIG. 4, data is applied to the IFFT at some predetermined frame rate. This data includes the signaling channel symbols emanating from controller 30, the error control symbols of error correction code generator 13, and symbols delivered by demultiplexers 11 and 12. Demultiplexers 11 and 12 operate under control of controller 30, which specifies to each multiplexer the particular output port to which incoming bit groupings are to be applied. For example, controller 30 may direct demultiplexer 11 to send a group of 4 bits to the second output port of demultiplexer 11, to send the next 6 bits to the fourth output port of demultiplexer 12, the next 5 bits to the fifth output port of demultiplexer 11, etc. Concurrently, controller 30 may direct demultiplexer 12 to deliver a group of 4 bits to the first output port of demultiplexer 12, to deliver the next 6 bits to the second output port of demultiplexer 12, and the next 5 successive groups of 5 bits each to successive output ports of demultiplexer 12 (making up the entire set of bits provided to demultiplexer 12 in the course of one frame). Controller 30 is arranged, of course, so that output signals of demultiplexers 11 and 12 do not collide. As depicted in FIG. 4, the first, second and last outputs of demultiplexer 12 are connected to the first, third and last outputs of demultiplexer 11 and, therefore, the above-illustrated control that controller 30 applies to demultiplexers 11 and 12 is proper.

As the number of signal sources from interfaces 40 and 50 changes, controller 30 changes the number of tones (ports applying signals to the IFFT) that are devoted to those sources.

Ethernet interface 60 is quite simple. Its function is to serve as a conventional ethernet interface between elements 191, 192, and 193 as well as an ethernet interface to element 31. The conventional ethernet format comprises packets that are launched on a bus. Each packet includes a preamble field, a destination address field, a source address field, a type field, a data field, and a CRC error correcting code. Interface 60, therefore, needs to include the conventional circuits that are needed for ethernet communication as well as a simple buffer for collecting data that arrives from a remote location via TVRC 10 and router 31 and placing it in the correct format. For signal flow in the other direction, interface 60 needs to do the converse format conversion and store data until it can be transmitted to the remote location by delivering it to router 31.

ISDN interface 50 is similar. For an interface adapted for BRI (Basic Rate Interface) which carries 144 Kb/s of data and 48 Kb/s of CRC code, interface 50 merely requires a buffer and format conversion for collecting data that arrives from a remote location via TVRC 10, router 31, and controller 30, and for storing data until it can be transmitted to the remote location by delivering it to controller 30. The controller can then effect format conversions between the ISDN format and the format of signals delivered to the IFFT.

Figure 5:
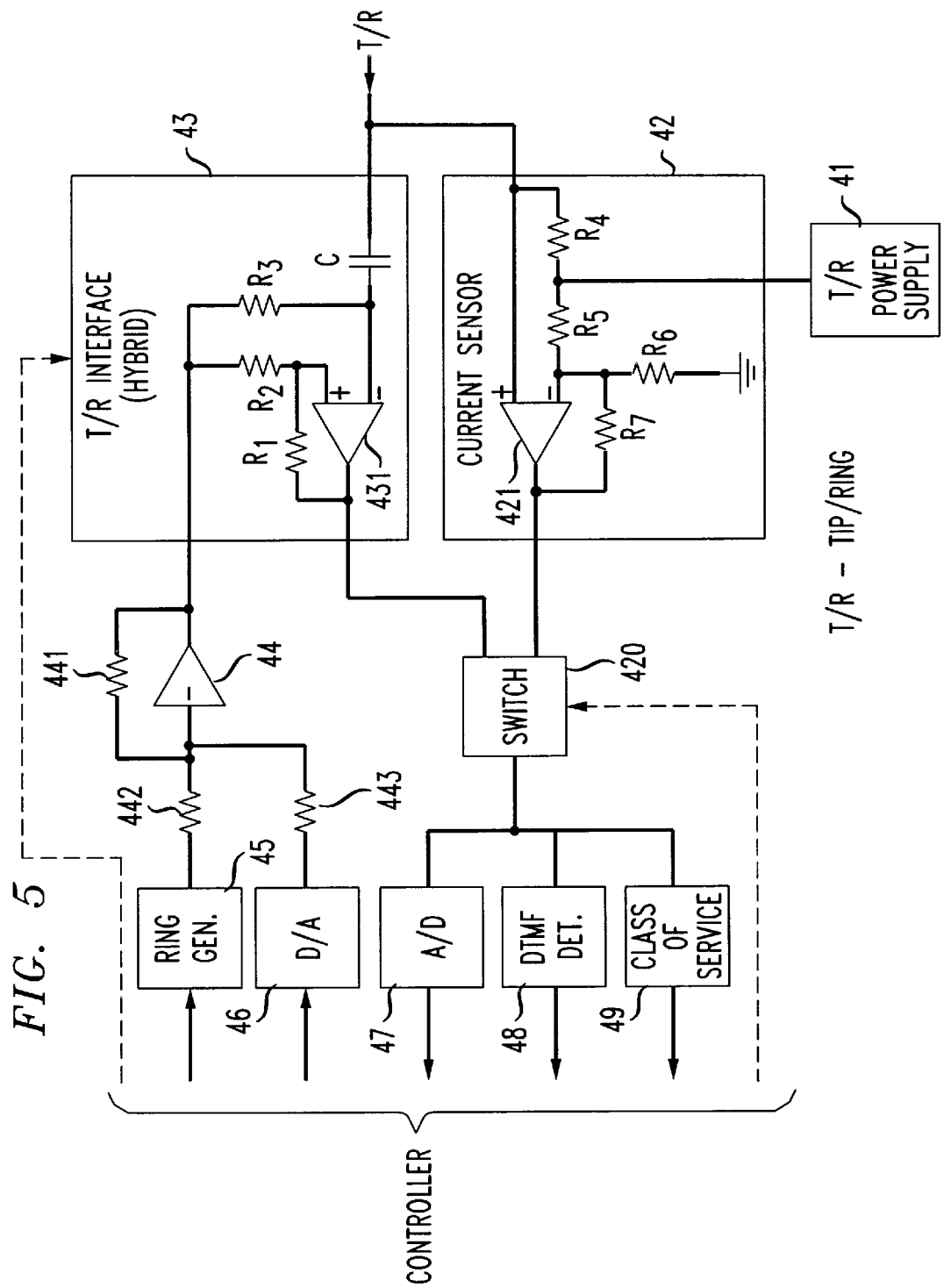
FIG. 5 depicts one embodiment of the POTS interface shown in FIG. 1.

POTS interface 40 is slightly more involved because it needs to simulate the conventional analog connection and protocol. FIG. 5 illustrates one embodiment of interface 40. In FIG. 5, the T/R port is the tip/ring port to which "analog" devices such as telephone 130 are connected. Power supply element 41 is a conventional power source that is adapted to provide tip/ring current to activate the "analog" devices. Preferably, power supply 41 comprises an accurate voltage source with over-current protection which, through resistor R4, provides DC current to devices connected to the T/R port. When one of those devices, such as telephone 130, goes "off hook", current is drawn by the device and this current causes a voltage drop across R4. Resistors R5 and R6, in combination with R4 and the impedance of the "off hook" device, form a Wheatstone bridge which allows operational amplifier 421 (in combination with R7) to develop a voltage that very accurately reflects the impedance that is presented by the "off hook" device(s) to the T/R port.

At some regular, predetermined, rate, controller 30 routes the output of amplifier 421 to A/D converter 47 via switch 420 and therefrom to controller 30. Controller 30 can thus determine when a device goes "off hook" or "on hook", and can also determine which of the devices made the change in state. This capability comes about from the fact that different devices have slightly different characteristic impedances.

This results from the use of different circuits in different devices, from the manufacturing process of different ICs, etc.

Element 43 is a hybrid circuit. Signals received by element 43 from amplifier 44 are delivered to the T/R port, and signals received from the T/R port are delivered to switch 420. The hybrid circuit is formed from operational amplifier 431, resistors R1, R2, and R3, and capacitor C. Capacitor C simply provides a DC block, while resistors R1, R2 and R3 combine to insure that the output of amplifier 431 is sensitive only to signals delivered to the T/R port by the devices connected to the port, and not by amplifier 44. This signal-flow isolation occurs when the value of R3 is equal to the value of the impedance presented by the devices connected to the T/R port, Ro, multiplied by the quotient R2/R1. The value of resistor R3 can be made electronically adjustable and since the impedance value of Ro is known to controller 30, the value of R3 can be appropriately set by controller 30.

When switch 420 is appropriately set, it delivers the output of amplifier 431 to A/D converter 47, to DTMF detector 48 and to class-of-service detector 49. The output signals of elements 47, 48, and 49 are applied to controller 30. In the opposite signal flow direction, controller 30 applies signals to ring generator 45 and to D/A converter 46. The outputs of elements 45 and 46 are combined in an arrangement comprising operational amplifier 44 and resistors 441, 442, and 443, and applied to hybrid circuit 43.

Ring generator 45 develops the conventional telephone ringing signal to alert devices that are connected to the T/R port of an incoming call. This is a conventional signal generator circuit that is activated by controller 30. In appropriate circumstances, controller 30 also imparts data through D/A converter 46 between the first and second ring, in appropriate format, to provide a caller-ID signal for device 180, if one is connected to the T/R port. The signal developed by ring generator 45 could have been developed by controller 30, but the use of the specialized circuit works to reduce the computation load on controller 30.

DTMF detector 48 determines whether DTMF signals are being presented by a device that is connected to the T/R port. Such signals are presented when dialing, when responding to prompts of voice response systems, etc. Again, the function of detector 48 can be accomplished within controller 30, but the use of a specialized circuit works to reduce the computational load on controller 30. It should be realized that the DTMF signals are not always used to control the telecommunication network but rather, as in the case of voice response systems, they can be used as part of the informational signal that needs to reach the remote party with which the device that initiated the DTMF signals is communicating. In such circumstances, controller 30 might simply ignore the output of DTMF detector 48, or transmit that information via the signaling channel, to be injected later as a DTMF signal into the signal that is delivered to the remote party.

Lastly, class-of-service circuit 49 is sensitive to signals that may be provided by one of the devices connected to the T/R port which provide information about the device. This information may be such that apparatus 100 might wish to have (for example, to assign a broader bandwidth for the communication), or information that may be useful for the remote party to know even prior to connection. For example, it would be useful for the remote party to know whether an incoming call is from a telephone or from a fax machine. As with the elements 45 and 48, the function of element 49 can be implemented within controller 30.

Returning to FIG. 1, element 200 encompasses hardware at the communication service provider facility. More specifically, within apparatus 200 wire pair 5 is connected to TVRC modem 210 which is under control of controller 220, and the output of modem 210 is applied to element 230. Elements 210, 220, and 230 function in a manner that is very similar to the manner that elements 10, 30 and 31 function, except that modem 210 needs to recognize when relay 20 in apparatus 100 is connected directly to the T/R port of apparatus 100. This is easily achieved when the input impedance of hybrid 106 (viewed from the connection to wire pair 5) is higher than input impedance of hybrid 43 of FIG. 5 in parallel with the input impedance of current sensing circuit 42 of FIG. 5, because a current sensing circuit such as circuit 42 can be incorporated in modem 210 and that circuit would detect the condition where relay 20 is connected to the T/R port of apparatus 100.

The output of router 230 is applied to either network A or to network B. Networks A and B represent any differentiation of service that the provider may wish to offer, such as cellular network and wired network, circuit switched network and packet switched network, a network owned by AT&T and one that is not owned by AT&T, etc.

Figure 6:
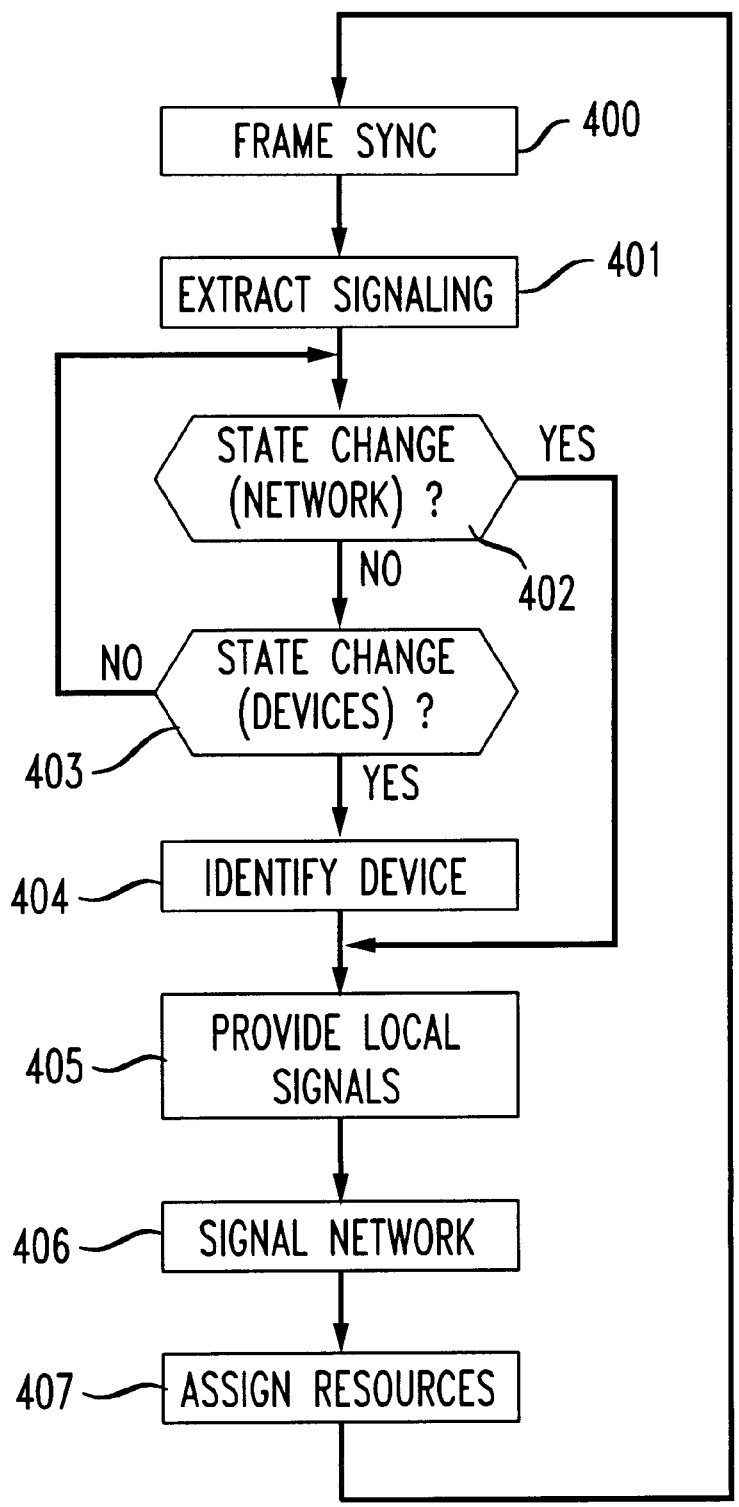
FIG. 6 represents a flow chart of the processes carried out in the apparatus shown in FIG. 1.

FIG. 6 presents a flow chart of the processes carried out in apparatus 100. Block 400 is responsible for acquiring and maintaining sync with data frames arriving at TVRC modem 10. This may be accomplished by controller 30 initially directing router 31 to send all data to the controller and the controller detecting the presence of a unique bit sequence (start sequence) that marks the beginning of a frame. Thereafter, controller 30 directs router 31 to route all signaling channel tones as well as the start sequence to controller 30. Block 401 analyzes the content of the signaling channel tones, which allows the following processes. Block 402 in FIG. 6 determines whether the signaling channel indicates that the network seeks to change the status of the interactions. This can be, for example, an indication that a call is incoming, or that an established call is terminated. When no such indication is present, control passes to block 403, which determines whether a device coupled to interfaces 40, 50, or 60 seeks to changes status. Here, too, the status change may be indicative of a call being initiated or terminated.

When a change of status is indicated by block 403, control passes to block 404 which identifies the specific device that causes the change of status. Thereafter, control passes to block 405 which provides the necessary local signals that the device requires, and passes control to block 406. Block 406 signals the network, as appropriate, and passes control to block 407, which assigns resources based on the change in status and returns control to block 400.

Some examples may be beneficial.

Assuming a completely dormant condition, where none of the customer premises devices are active, controller 30 merely maintains the sync with incoming signal frames, and the signaling channel is "quiet". Assuming that telephone 130 goes "off hook", in the course of carrying out the process of block 403, the increased current drain at the T/R port is communicated by amplifier 421 and switch 420 to controller 30, and the controller, pursuant to block 404, determines which device went "off hook." In this example, it is determined that telephone 130 is "off hook."

As an aside, the determination in block 404 that it is telephone 130 that went "off hook," rather than some other device at the T/R port comes, as indicated above, from the voltage level developed by amplifier 421. It is expected that the voltage level developed when telephone 130 is "off hook" will certainly be different from when device 150 (answering machine) is "off hook". It is even possible that the voltage developed by telephone 140 being "off hook" will also be different from the voltage level developed when telephone 130 is "off hook." The translation from voltage level to device identity can be stored in controller 30 pursuant to a training session that can be activated by a customer. In such a session, a specific device is taken "off hook," the developed voltage level is observed, and the information is recorded and stored in controller 30. The expected voltage levels for combinations of devices being "off hook" can be calculated and stored in controller 30 by the use of well known equations.

Returning to the illustrated example, when controller 30 determines that device 130 went "off hook," pursuant to block 405 the controller provides a dial tone signal to the T/R port via D/A converter 46, amplifier 44, and hybrid circuit 43. When telephone 130 outputs its DTMF dialing signals, detector 48 ascertains what those signals are and provides them to controller 30. Pursuant to block 406, controller 30 incorporates the called party's number in the signaling channel tones that are applied to IFFT 103 and thus informs the apparatus 200 of the intended called party. Almost concurrently, pursuant to block 407, controller 30 determines that telephone 130 requires a bandwidth of only 4 KHz and assigns an appropriate number of tones to telephone 130. Thereafter, controller 30 delivers the speech signal of telephone 130 to the selected tones and, conversely, applies data derived from these tones which comes from FFT 111 to telephone 130 via D/A converter 46.

When telephone 130 ends the conversation and goes "on-hook", controller 30 detects the voltage level of amplifier 421 and recognizes it as telephone 130 going "on-hook" and, in response thereto, controller 30 sends an appropriate signal over the signaling channel to the network to indicate that telephone 130 went "on-hook". Controller 30 also frees up the tones that previously were assigned to communication by telephone 130.

When a remote party wishes to be connected to a POTS telephone instrument, apparatus 200 sends a signal to controller 30 over the signaling channel, informing controller 30 that a POTS connection is desired. In appropriate circumstances (e.g., the customer subscribes to caller ID), apparatus 200 also sends caller ID information over the signaling channel. In response, controller 30 directs ring generator 45 to begin to apply a ringing signal to amplifier 44. When caller ID information is received by controller 30, controller 30 also applies caller ID information to amplifier 44 (between the first and second ring of ring generator 45), via D/A converter 46. The ringing signal is applied by hybrid circuit 43 to the T/R port, causing the various customer premises devices connected to the port to ring as appropriate. When one of those devices goes "off-hook", such as telephone 140, that fact is detected by controller 30 in the manner described above, and the detection of the off-hook condition causes controller 30 to direct ring generator 45 to cease ringing. Additionally, controller 30 applies appropriate control signals to the signaling channel, to inform the remote apparatus (200) that telephone 140 went "off-hook" and that therefore the switched connection can be established.

Whether or not a POTS connection is active at the T/R port, there is ample capacity left available for the ISDN devices and for the data devices. That capacity is assigned by controller 30 by first assigning capacity to the ISDN devices, if they are active, and assigning the remaining capacity to the digital devices. The assigning of capacity to the ISDN devices and the protocol for establishing and taking down connections to the ISDN devices roughly parallels the above description in connection with the POTS devices. The capacity that is assigned to the digital devices is utilized, as needed, by the devices. Normal flow control protocols apply to ensure that data is not lost on the one hand, and capacity is not left idle when data needs to be transmitted, on the other hand.

The above description addresses an embodiment where there is a single port devoted to POTS devices, a single ISDN port, and a digital port. Illustratively, the ISDN port was described as a BRI interface. It should be understood, however, that greater capacities can be provided to the isochronous devices. For example, the ISDN port can be adapted for PRI (primary rate interface) which provides 23 B channels (rather than two B channels in BRI). Also, a plurality of POTS interface 40 circuits can be included, each of which would interface with controller 30 and provide an independent 4 KHz band analog port for POTS service.

We claim:

1. An apparatus for placement on a customer premises and for connecting premises communication devices to a wire pair leading to a communication network, comprising:

a network port for connecting to the wire pair;

a set of premises ports, containing at least one premises port, for connecting premises communication devices to said apparatus;

a modulator connected to said network port that modulates an digital signal that is applied to a digital port of said modulator into a modulated analog signal that comprises a plurality of analog signals that are at least substantially orthogonal to each other and demodulates a received analog signal to form a digital signal that is applied to said digital port, where said received analog signal is signal received at said network port and which contains a plurality of analog signals that are at least substantially orthogonal to each other;

a multiplexer for separating the digital signal applied by said modulator to said digital port into a first stream applied to a first internal port and a second stream applied to a second internal port, and for combining a digital signal provided to said first internal port and a digital signal provided by said second internal port into a single stream that is applied to said digital port of said modulator;

an interface module between said first internal port and at least one premises port of said apparatus that is adapted for interfacing with digital premises equipment; and a controller module between said second internal port and at least one premises port of said apparatus that is adapted for adjustably allocating bandwidth to premises equipment and for coupling to said premises equipment, where said premises equipment is taken from a set comprising POTS premises equipment and ISDN premises equipment.

2. The apparatus of claim 1 where the means for applying forms the primary termination of the wire pair at the customer premises.

3. The apparatus of claim 1 where the means for applying forms the sole termination of the wire pair at the customer premises.

4. The apparatus of claim 1 wherein said interface module is an ethernet interface module.

5. The apparatus of claim 1 where said interface module is a first interface module and said apparatus comprises a second interface module interposed between said controller module and at least one other premises port of the apparatus.

6. The apparatus of claim 4, with an ISDN interface module connected between said controller module and a synchronous equipment port, and a POTS interface module connected between said controller module and an analog equipment port.

7. The apparatus of claim 1 wherein said modulator employs multi-tone modulation.

8. The apparatus of claim 7 where a preselected number of tones employed by said modulator are devoted by the controller module to control functions.

9. The apparatus of claim 8 where at least one of the premises devices connected to said set of premises ports is asynchronous, and at least one is synchronous, and where the controller assigns a first number of the tones employed by said modulator to the asynchronous premises devices and a second number of the tone employed by said modulator to the synchronous premises devices.

10. The apparatus of claim 9 where the controller selects said first number of tones and said second number of tones to satisfy bandwidth needs of the asynchronous premises devices and the bandwidth needs of the synchronous premises devices.

11. The apparatus of claim 10 where the controller module assigns the tones dynamically.

12. The apparatus of claim 10 where the controller module increases said first number of tones when an additional asynchronous premises device becomes active, and reduces said first number of tones when an active asynchronous premises device ceases to be active.

13. The apparatus of claim 10 where the tones are assigned by the controller to form groups of tones that are assigned to asynchronous and synchronous premises devices.

14. The apparatus of claim 5 where the second interface and said controller, in combination, include a current sensing circuit for sensing the current flowing through the analog equipment port, and a current computation module that, based on the sensed current, determines whether a premises device connected to the analog equipment port is active.

15. The apparatus of claim 14 where the current computation module determines which of a number of premises devices connected to the analog equipment port is active.

* * * * *

UNITED STATES PATENT AND TRADEMARK OFFICE
CERTIFICATE OF CORRECTION

PATENT NO. : 6,061,326
DATED : May 9. 2000
INVENTOR(S) : Robert Raymond Miller Jesse Eugene Russell It is certified that error appears in the above-identified patent and that said Letters Patent is hereby corrected as shown below:

Column 8,
Line 29, change "an" to --a--;

Column 9,
Line 16, change "tone" to --tones--;

Signed and Sealed this

Seventeenth Day of July, 2001

Attest:

*Attesting Officer*

NICHOLAS P. GODICI
*Acting Director of the United States Patent and Trademark Office*